(12) United States Patent
Lee

(10) Patent No.: US 7,952,970 B2
(45) Date of Patent: May 31, 2011

(54) APPARATUS AND METHOD FOR DETECTING AN OPTIMAL WRITING POWER

(75) Inventor: Jeong Yeol Lee, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 102 days.

(21) Appl. No.: 11/898,898

(22) Filed: Sep. 17, 2007

(65) Prior Publication Data

US 2008/0068737 A1    Mar. 20, 2008

Related U.S. Application Data

(63) Continuation of application No. 10/951,770, filed on Sep. 29, 2004, which is a continuation of application No. 09/549,045, filed on Apr. 13, 2000, now Pat. No. 6,813,107.

(30) Foreign Application Priority Data

Apr. 13, 1999   (KR) .................................. 99-12903

(51) Int. Cl.
*G11B 7/12* (2006.01)

(52) U.S. Cl. .................................. 369/47.53; 369/275.3

(58) Field of Classification Search ............... 369/47.53, 369/53.21, 13.02, 275.03, 53.1, 45.53, 275.1, 369/53.19
See application file for complete search history.

(56) References Cited

U.S. PATENT DOCUMENTS

| | | | |
|---|---|---|---|
| 5,226,027 A | 7/1993 | Bakx et al. | |
| 5,295,126 A | 3/1994 | Okano et al. | |
| 5,305,297 A | 4/1994 | Nishiuchi et al. | |
| 5,436,880 A | 7/1995 | Eastman et al. | |
| 5,450,383 A | 9/1995 | Call et al. | |
| 5,602,814 A | 2/1997 | Jaquette et al. | |
| 5,721,856 A | 2/1998 | Takeuchi | |
| 5,745,459 A | 4/1998 | Inokuchi et al. | |
| 5,778,257 A | 7/1998 | Tsukatani et al. | |
| 5,790,491 A | 8/1998 | Jaquette et al. | |
| 5,825,726 A | 10/1998 | Hwang et al. | |
| 5,838,658 A | 11/1998 | Nakane et al. | |
| 5,872,763 A | 2/1999 | Osakabe | |
| 6,052,347 A * | 4/2000 | Miyata | 369/47.53 |
| 6,078,559 A * | 6/2000 | Takemura et al. | 369/275.3 |
| 6,160,779 A | 12/2000 | Usui et al. | |
| 6,272,086 B1 | 8/2001 | Jaquette et al. | |
| 6,317,397 B1 | 11/2001 | Deguchi et al. | |
| 6,813,107 B1 * | 11/2004 | Lee | 369/47.53 |
| 6,912,188 B2 | 6/2005 | Morishima | |
| 6,937,548 B2 * | 8/2005 | Hsiao et al. | 369/47.53 |
| 6,967,912 B1 | 11/2005 | Roh | |
| 7,423,945 B2 * | 9/2008 | Ueki | 369/47.53 |

FOREIGN PATENT DOCUMENTS

| | | |
|---|---|---|
| JP | 9-231576 A | 9/1997 |
| JP | 9-288825 A | 11/1997 |

* cited by examiner

*Primary Examiner* — William J Klimowicz
*Assistant Examiner* — Kim-Kwok Chu
(74) *Attorney, Agent, or Firm* — Birch, Stewart, Kolasch & Birch, LLP

(57) ABSTRACT

A method and apparatus for accomplishing an OPC (optimal power calibration) at a test area secured in data recording area of a writable optical recording medium and detecting an optimal writing power appropriate to the test area, are discussed. According to an embodiment, the method searches for a marginal area adjacent to a data section recorded on an optical recording medium, records test data on the marginal area discovered in the searching step while changing a writing power; and reproduces the test data recorded on the marginal area and determining an optimal writing power based upon the characteristics of the reproduction signal.

8 Claims, 4 Drawing Sheets

APPARATUS AND METHOD FOR DETECTING AN OPTIMAL WRITING POWER

This application is a Continuation of co-pending application Ser. No. 10/951,770 filed on Sep. 29, 2004, which is a continuation of application Ser. No. 09/549,045 filed on Apr. 13, 2000 (now U.S. Pat. No. 6,813,107), and for which priority is claimed under 35 U.S.C. §120; and this application claims priority of Application No. 99-12903 filed in Korea on Apr. 13, 1999, under 35 U.S.C. §119. The entire contents of all are hereby incorporated by reference.

BACKGROUND OF THE INVENTION

1. Field of the Invention

The present invention relates to a method and an apparatus for detecting an optimal writing power for recording user data on a writable optical recording medium.

2. Description of the Related Art

FIG. 1 is a simplified block diagram of a conventional apparatus for recording data on a writable optical disk. The apparatus comprises an A/D converter 20 for digitizing an analog signal, an MPEG encoder 30 for encoding the digitized data into the MPEG format, a digital recording signal processing unit 70a for converting the MPEG-formatted data into recording-formatted EFM (Eight to Fifteen Modulation) data while adding additional data such as error correction codes, a channel bit encoder 80 for converting the recording-formatted data into writing signals, an optical driver 81 for yielding signals to drive a LD (laser diode), an optical pickup 11 for recording signals onto surface of a writable optical disk 10 and reproducing recorded signals from the optical disk 10, a driving unit 90 for driving the optical pickup 11 and a motor M to move and rotate respectively, an R/F unit 100 for equalizing and shaping the signals reproduced by the pickup 11 to produce binary signals, a servo unit 110 for controlling the driving unit 90 based upon a tracking and a focusing error signal provided by the pickup 11 and the rotation speed of the optical disk 10, a digital reproduced signal processing unit 70b for restoring compressed data from the binary signals using a self clock synchronized with the binary signals in phase, an MPEG decoder 120 for restoring original video and/or audio data by decoding the compressed data, and a microcomputer 60 for controlling overall operation of recording and reproduction.

Upon receiving a request for recording user data, the microcomputer 60 controls the pickup 11 through the servo unit 110 and the driving unit 90 to read the indicative target writing power recorded on the writable disk medium 10. In case where the disk 10 is a rewritable recording medium such as a CD-RW, the target writing power is recorded as 3-bit data W1, W2, and W3 in the M1 information byte in the field of ATIP (Absolute Time In Pre-Groove) located in the lead-in area of the optical disk 10. FIG. 2 shows the recording format of the bits 'W1W2W3' and the meaning of each value.

After reading the target writing power data W1, W2, and W3, that is, the indicative target writing power $P_{ind}$, recorded as above, the microcomputer 60 transfers predetermined test data, for example, a byte of 10101010, to the channel bit encoder 80 through the digital recording signal processing unit 70a. For recording digital bit streams outputted from the digital recording signal processing unit 70a, the channel bit encoder 80 converts the bit streams into PWM (pulse-width-modulated) signals and applies the modulated signals to the optical driver 81.

The microcomputer 60 applies power adjusting data to the optical driver 81 and changes its value in sequence as shown in FIG. 3 for changing the writing power within a given range with respect to the read target writing power whose intensity is assumed to 8 mW in FIG. 3. In response to the power adjusting data, the optical driver 81 outputs writing signals whose power corresponds to the applied power adjusting data so that the pickup 11 records the digital bit streams for testing in the test area of the optical recording medium 10. In the case where the optical recording medium 10 is a rewritable CD such as a CD-RW, the test data are recorded in test area A of the PCA (Power Calibration Area) as shown in FIG. 4.

Along with recording the digital bit streams for power testing, the microcomputer 60 controls the optical pickup 11 to write null data of one ATIP in the count area B located in the PCA to indicate how many times test writing is accomplished. For example, if this recording of the digital bit stream for power testing is executed thirdly for the disk 10, the null data are written to the third ATIP of the count area B located in the PCA as shown in FIG. 4 to indicate that test operations were executed three times.

On the condition that the test data have been recorded in the test area A of the PCA with the varying writing power, the microcomputer 60 controls the pickup 11 to reproduce the most recently recorded digital bit streams for power testing. While reproducing the test data, the microcomputer 60 keeps detecting the jitter magnitude of the binary signals converted from the reproduced RF (Radio Frequency) signals by the R/F unit 100. Then, if the detected jitter magnitude is lowest, the microcomputer 60 determines the writing power used to record the test data whose jitter magnitude is lowest as an optimal writing power for the disk 10. That is, the power Pop is chosen to optimal in FIG. 3.

If external video and/or audio signals are received for recording after the optimal writing power Pop is determined, the received video and/or audio signals are digitized by the A/D converter 20 and encoded into the MPEG formatted data by the MPEG encoder 30. The digital recording signal processing unit 70a generates digital bit streams modulated from the encoded data and error correction codes added to the encoded data by itself. The channel bit encoder 80 converts the digital bit streams into PWM signals and applies the modulated signals to the optical driver 81 to record the modulated bit streams to the disk 10.

Meanwhile, the microcomputer 60 sets the optical driver 81 to generate a driving current corresponding to the optimal writing power Pop obtained through the previous procedure. Therefore, the PWM signals whose power is optimal for the disk 10 causes the received data to be recorded in the program area of the optical disk 10.

In the above-explained conventional method for recording data on an optical disk, when a request is received for recording new data successively from the record-ending point of the program area after a previous data recording operation is done, the microcomputer 60 performs the afore-mentioned OPC (Optimal Power Calibration) again. In other words, the microcomputer 60 repeats the OPC whenever a request for recording additional data is received.

However, the OPC needs to move a pickup inwardly and outwardly, that is, between PCA and program area. This takes a relatively long time to start data recording, and delays the data recording operation.

Moreover, since the test area A of PCA for an optimal writing power calibration is located inwardly from a lead-in area of the program area of an optical disk where user data are to be recorded, the characteristics of recording environment of the program area may be different from that of the test area.

Accordingly, sometimes an optimal writing power detected from the test area is not optimal for the recording area where user data are to be written.

SUMMARY OF THE INVENTION

It is an object of the present invention to provide a method and an apparatus for detecting an optimal writing power, which reserves OPC areas in the user data area and detecting an optimal writing power through test writing and reading at the reserved OPC areas.

The optimal writing power detecting apparatus according to the present invention comprises a writing/reading means for recording and reproducing data to/from the recording medium; a servo controlling means for moving said writing/reading means to a reserved spare area adjacent to a data section recorded in the recording medium; and a controlling means for controlling said writing/reading means to record test data in the reserved spare area while changing a writing power and to reproduce the recorded test data from the spare area, and detecting an optimal writing power based upon the characteristics of the reproduced signals.

The optimal writing power detecting method according to this invention comprises the steps of searching for a marginal area adjacent to a data section recorded on an optical recording medium; recording test data on the marginal area discovered in the searching step while changing a writing power; and reproducing the test data recorded on the marginal area and determining an optimal writing power based upon the characteristics of the reproduced signal.

In the present invention, the servo controlling means moves the writing/reading means to the reserved area adjacent to the data section on which user data have been most recently recorded on the optical disk, and the writing/reading means writes test data in the reserved area. While the data are being written, the controlling means controls the writing power of the writing/reading means to be changed step by step. After such writing of the test data, the test data are then reproduced by the writing/reading means and an optimal writing power is determined based upon the quality of the reproduced signals.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
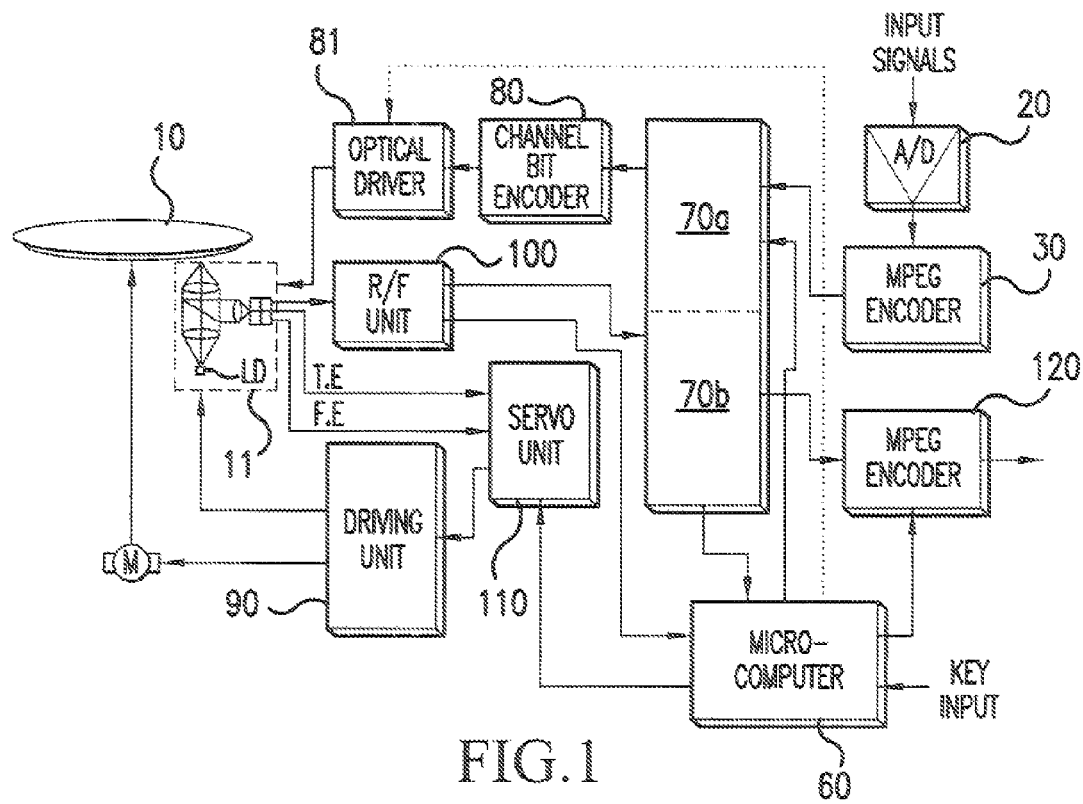
FIG. 1 is a simplified block diagram of a conventional data recording/reproducing apparatus.
Figure 2:
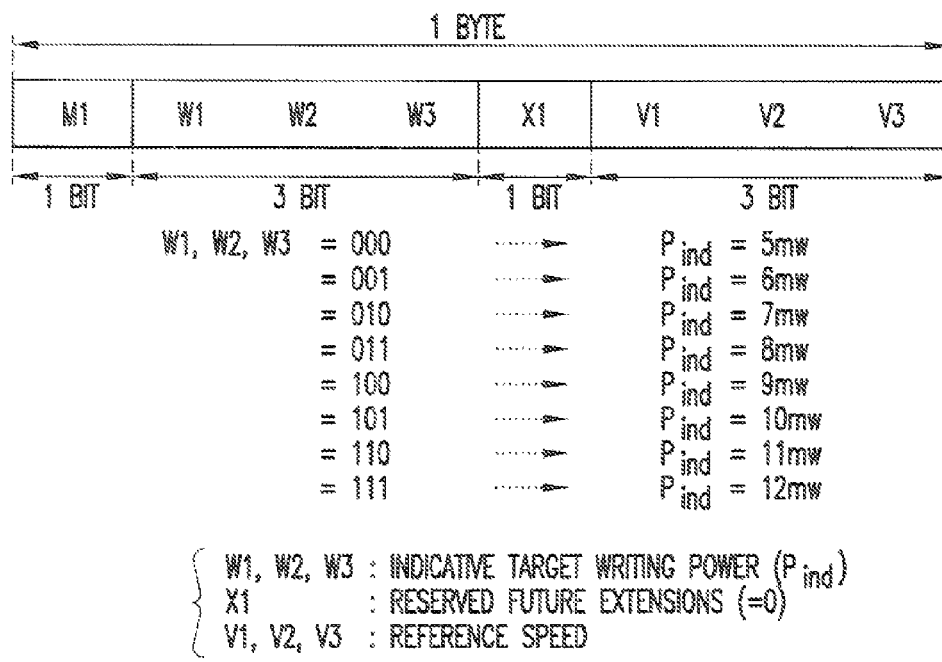
FIG. 2 is a data example corresponding to the indicative target writing powers recorded on a rewritable optical recording medium.
Figure 3:
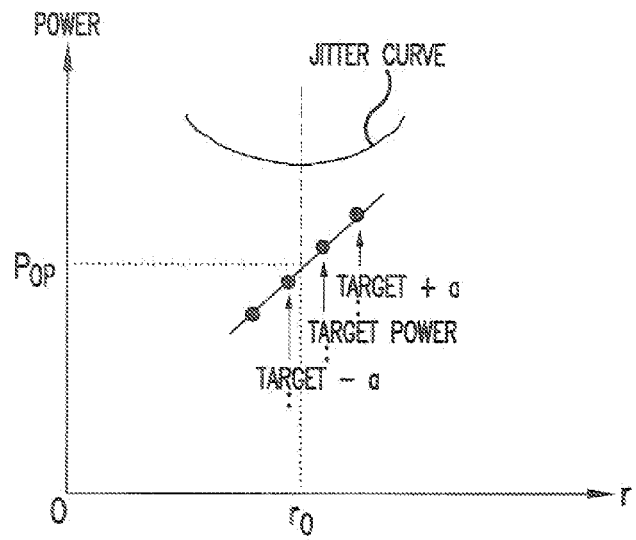
FIG. 3 is an illustrative graph showing the writing power being changed within a range with respect to the designated target writing power when recording test data.
Figure 4:
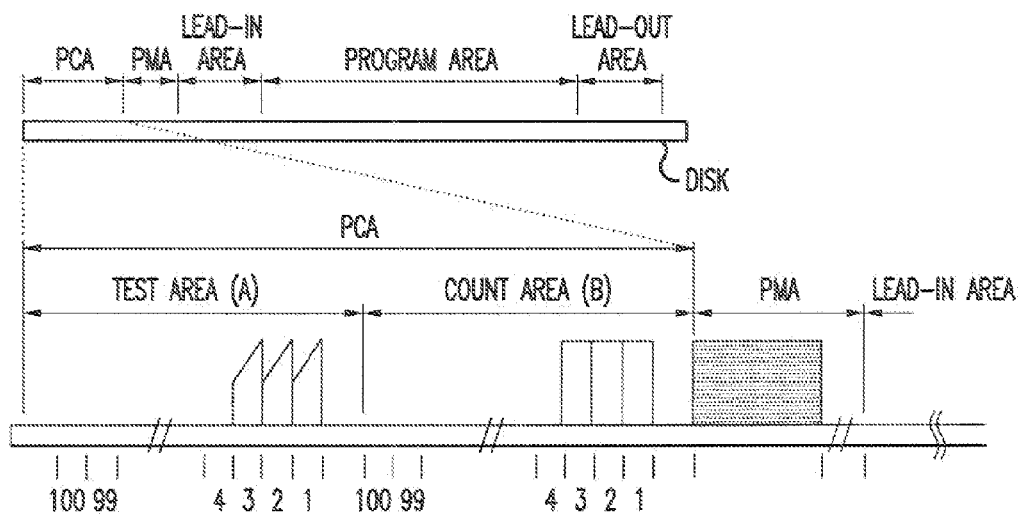
FIG. 4 is a view of the test area reserved in the PCA of a CD-RW for detecting an optimal writing power.

The apparatus embodying the present invention is all the same as that shown in FIG. 1 except that the microcomputer 60 according to the present invention regards the part of marginal areas such as pre-gap areas, post-gap areas, and blank areas as test areas for OPC, and searches for OPC areas based upon sync data preceding and following each test area when data recording is requested.

The pre-gap and post-gap areas are reserved for every data recording track, and the blank area is reserved for every data session in a writable optical disk.

The writable optical disk according to the present invention reserves the marginal areas located adjacent to data recording sections such as tracks or sessions as well as a conventional OPC area located inner than a lead-in area as OPC areas to be used for detecting optimal writing power. The marginal area consists of sync areas for a start sync and an end sync data, a test area reserved between the sync data, and a spare area. The test area is allocated 1-2 blocks in size with the sync areas included.

The codes of a start sync data and an end sync data may be different each other, for example, if 16 bits are allocated for each sync data, $0F0F_{(16)}$ is for the start sync code and $0E0E_{(16)}$ is for the end sync.

The data section means one track if data are recorded and grouped in a track unit, and it means one session if data are recorded and grouped in a session unit.

Figure 5:
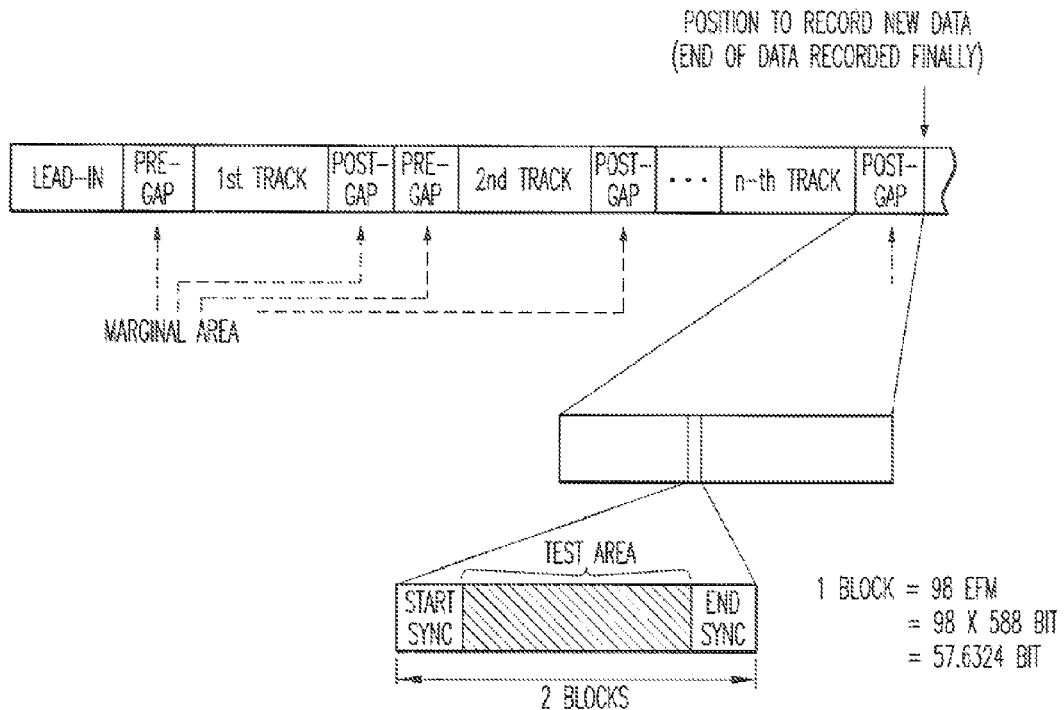
FIG. 5 is a data recorded example for a writable optical recording medium reserving test areas between data tracks of the present invention.
Figure 6:
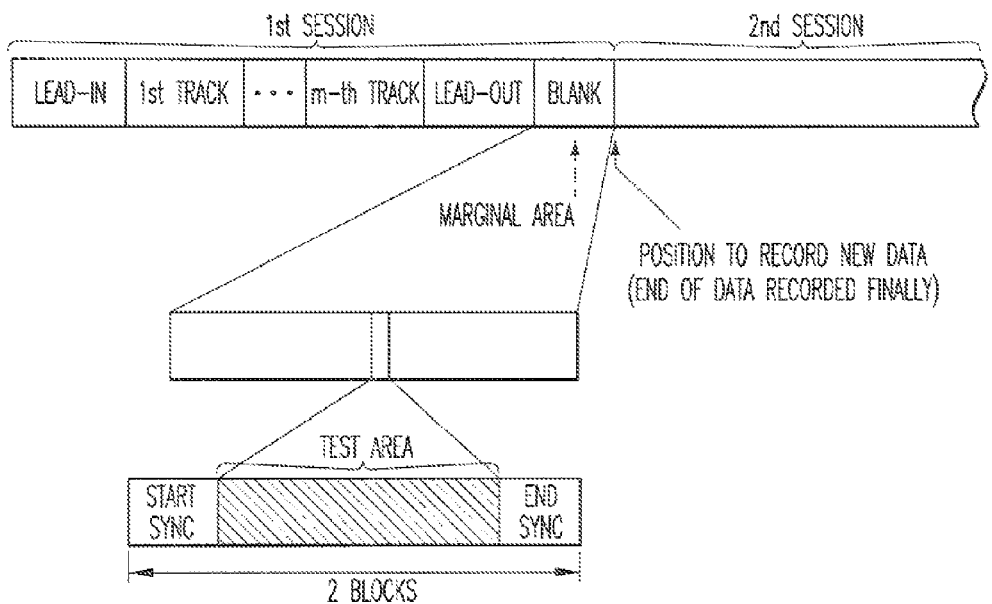
FIG. 6 is another data recorded example of a writable optical recording medium reserving test areas between data sessions of the present invention.

The marginal area shall be a pre-gap and a post-gap, whose size may be more than 150 blocks, before and behind a data track if data recorded are grouped in a track unit as shown in FIG. 5, and it shall be a blank area, whose size may be also more than 150 blocks, following a data session if data recorded are grouped in a session unit as shown in FIG. 6.

Figure 7:
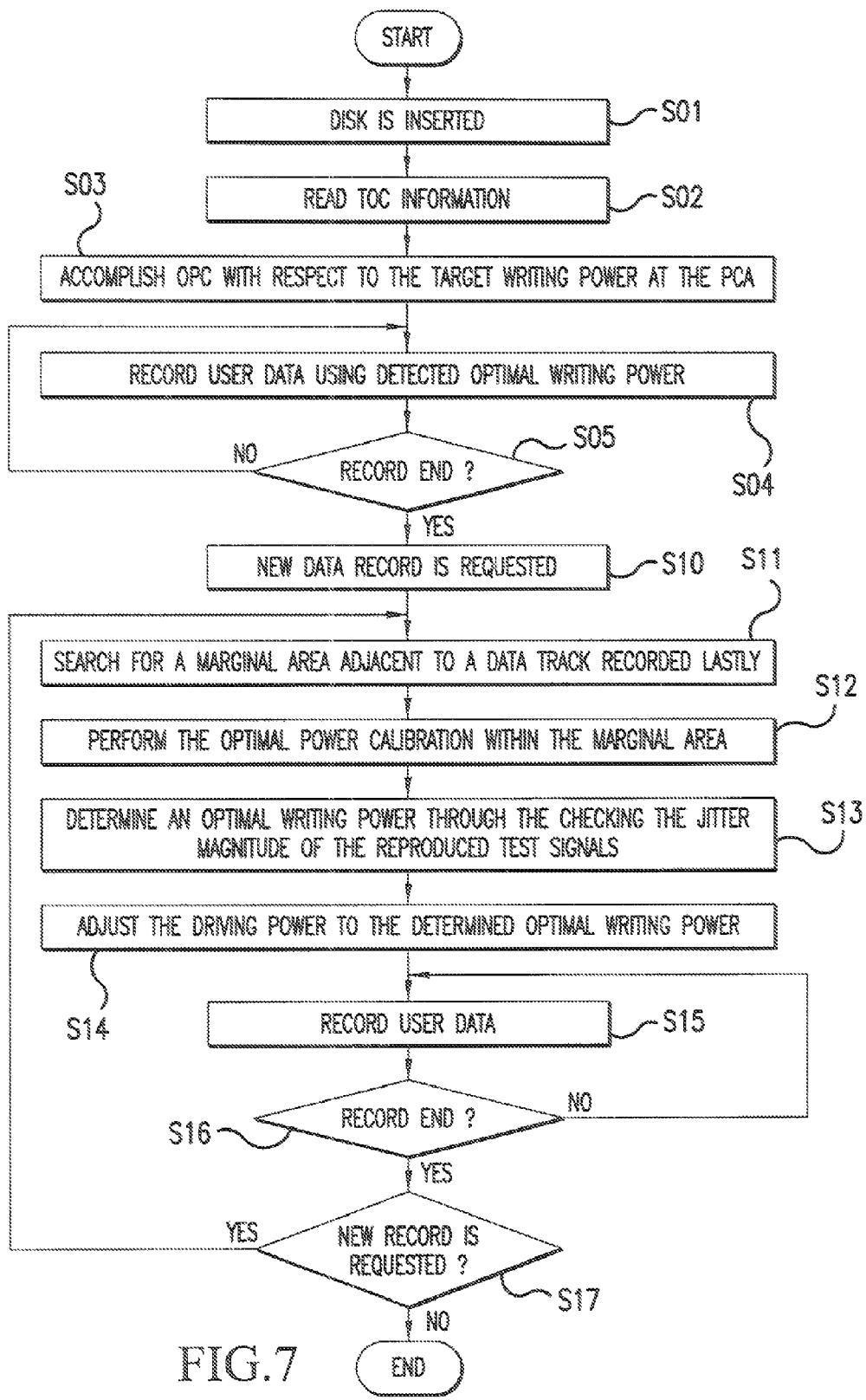
FIG. 7 is a flow diagram of an optimal writing power detecting method for an optical recording medium according to the present invention.

FIG. 7 is a flow diagram of the optimal writing power detecting method embodying the present invention. Referring to FIG. 1 assumed to have the microcomputer 60 replaced with one according to the present invention, the operation of the apparatus and the optimal writing power detecting method in accordance with the present invention will be explained in detail.

When the writable optical disk 10 having no recorded data is inserted (S01), the microcomputer 60 moves the optical pickup 11 to the lead-in area of the optical disk 10 through controlling the servo unit 110 and the driving unit 90 to retrieve various recording/reproduction control information recorded in the lead-in area, and temporarily stores the retrieved information in an internal memory (S02).

The microcomputer 60 also performs the conventional optimal power calibration (S03) which records test data in the PCA area of the optical disk 10 while changing a target writing power step by step, then reproduces the recorded data while detecting an optimal writing power based upon jitter characteristics of the reproduced signals.

After the optimal writing power is detected, the microcomputer 60 determines the recording format of the disk 10. If the recording format is track unit, the microcomputer 60 controls the optical pickup 11 to skip non-recorded area through the servo unit 110 and the driving unit 90 to secure a pre-gap of more than 150 blocks. Skipping the pre-gap area, the microcomputer 60 records the inputted user data on one or more data tracks having both of a pre-gap and a post-gap (S04), and when the recording is done (S05), the microcomputer 60 also secures a post-gap behind the last recorded track.

Meanwhile, whenever a pre-gap or a post-gap is secured, the microcomputer 60 writes sync data in front of and to the rear of a selected test zone to specify the test zone inside of the secured area.

When a new recording of user data is requested (S10) after the previous user data recording is finished according to above operation, the microcomputer 60 does not move the optical pickup 11 to the PCA area at this time. Instead, the microcomputer 60 controls the servo unit 110 and the driving unit 90 to move the optical pickup 11 to one of both reserved areas of a pre-gap and a post-gap preceding and following the last track on which user data were recorded. Preferably, the microcomputer 60 moves the pickup 11 to the post-gap rather than to the pre-gap, since the post-gap is nearer to a track for in which the new data are to be recorded (S11).

Then, the microcomputer performs the optimal power calibration within the reserved test area in the post-gap (S12) through writing and reading of the optical pick 11. Before this writing process, the microcomputer 60 searches for the start sync data recorded before the reserved test area. When the start sync data are found, the microcomputer 60 records test data in the test area. At that time, the microcomputer 60 controls the optical driver 81 to change the writing power intensity.

After test data recording to the reserved test area in the post-gap is finished, the microcomputer 60 determines an optimal writing power through the checking the jitter magnitude of test signals reproduced from the reserved test area (S13), and adjusts the output power of the optical driver 81 to the determined optimal writing power (S14).

After the optimal writing power has been set, the microcomputer 60 secures a pre-gap area first, then records the inputted user data behind the secured pre-gap using the optimal writing power (S15). When the recording of the user data is completed (S16), the microcomputer 60 reserves a post-gap area following the final recording location.

When testing for detecting an optimal writing power is accomplished in the reserved areas located before and/or behind data sections as explained above, it is preferable to write an additional information indicating that the reserved area is used for OPC in a TOC area to announce to other disk recording/reproducing devices not to misuse data recorded in this reserved area.

If inputted user data are recorded in the optical disk 10 and grouped in a session unit, the microcomputer 60 reserves a blank area behind a just-recorded session as shown FIG. 6. Then, before recording of new user data for a next session is started, the microcomputer 60 performs the above-explained optimal writing power detection in the reserved blank area following the recorded session.

The method and apparatus for detecting an optimal writing power according to the present invention reduces a delay time, which is required to move an optical pickup inwardly and outwardly to accomplish the OPC operation, from a recording request to practical data recording. The invention also enhances writing characteristics, since an optimal writing power is obtained from a test area which is very close to the area on which input user data are recorded.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for performing test recording on a storage medium, the storage medium including a first area provided for the test recording and a second area provided for recording user data, the apparatus comprising:
    a writer configured to selectively record test data to either a first part or a second part of the first area for a corresponding test recording in which the first part is located before the second area and the second part is located after the second area; and
    a controller configured to determine an optimal writing power by the test recording,
    wherein the test recording is performed based on an indicative target writing power read from the storage medium,
    wherein the optimal writing power is determined using independently said one of the first part or the second part that was selectively test data recorded, and
    wherein each of the first part and the second part includes an indicator to indicate a recordable area for the test recording in the first part or the second part.

2. The apparatus according to claim 1, wherein the indicator has a length of at least a predetermined size.

3. A method for performing test recording on a storage medium including a first area provided for the test recording and a second area provided for recording user data, wherein the first area is separated into a first part and a second part and in which the first part is located before the second area and the second part is located after the second area, the method comprising:
    selectively assigning either the first part or the second part for a corresponding test recording,
    detecting an optimal writing power using independently said one of the first part or the second part that was selectively test data recorded, and
    wherein each of the first part and the second part includes an indicator to indicate an available area for the test recording in the first part or the second part.

4. The method according to claim 3, wherein the data recording format is a track-based or a session-based recording format.

5. A recording apparatus, comprising:
    a recording unit configured to selectively record test data on a recording medium to either a first test area or a second test area that are located at opposite ends of a recording area used for recording user data for a corresponding test recording; and
    a controller configured to determine an optimal recording power based on the test recording, and to control the recording unit to record the user data using the determined optimal recording power,
    wherein the optimal recording power is detected using independently said one of the first test area or the second test area that was selectively test data recorded, and
    wherein each of the first test area and the second test area includes an indicator to indicate an available area for the test recording in the test area.

6. The apparatus according to claim 5, wherein the recording unit is further configured to read an indicative target recording power from the storage medium, and to perform a first recording test data operation using the indicative target recording power.

7. The apparatus according to claim 5, wherein the indicator has a length of at least a predetermined size.

8. The apparatus according to claim 7, wherein a data recording format of the storage medium is a track-based or a session-based recording format.

* * * * *